US009668198B2

(12) United States Patent
Ozturk et al.

(10) Patent No.: US 9,668,198 B2
(45) Date of Patent: May 30, 2017

(54) METHOD AND APPARATUS FOR DETERMINING TO USE X2 GATEWAY FOR X2 INTERFACE

(71) Applicant: QUALCOMM Incorporated, San Diego, CA (US)

(72) Inventors: Ozcan Ozturk, San Diego, CA (US); Gavin Bernard Horn, La Jolla, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 14/528,989

(22) Filed: Oct. 30, 2014

(65) Prior Publication Data
US 2015/0124702 A1 May 7, 2015

Related U.S. Application Data

(60) Provisional application No. 61/899,022, filed on Nov. 1, 2013.

(51) Int. Cl.
*H04W 40/24* (2009.01)
*H04W 24/00* (2009.01)
(Continued)

(52) U.S. Cl.
CPC ......... *H04W 40/246* (2013.01); *H04W 24/00* (2013.01); *H04W 84/045* (2013.01); *H04W 88/16* (2013.01); *H04W 92/20* (2013.01)

(58) Field of Classification Search
CPC .... H04W 40/246; H04W 40/24; H04W 92/20
See application file for complete search history.

(56) References Cited

U.S. PATENT DOCUMENTS

2011/0188452 A1* 8/2011 Borleske ................ G01D 4/004
370/328
2013/0137434 A1* 5/2013 Godin ..................... H04W 8/24
455/436
(Continued)

FOREIGN PATENT DOCUMENTS

WO 2012148217 A2 11/2012
WO WO-2014051402 A1 4/2014
(Continued)

OTHER PUBLICATIONS

CATT: "Consideration of Peer discovery and X2 setup", 3GPP Draft; R3-131706, 3rd Generation Partnership Project (3GPP), Mobile Competence Centre; 650, Route Des Lucioles; F-06921 Sophia-Antipolis Cedex; France, vol. RAN WG3, no, Venice, Italy; Oct. 7, 2013-Oct. 11, 2013, Sep. 28, 2013 (Sep. 28, 2013), pp. 1-3, XP050719980, Retrieved from the Internet: URL:http://www.3gpp.org/ftp/tsg_ran/WG3_lu/TSGR3_81bis/Docs/ [retrieved on Sep. 28, 2013].
(Continued)

*Primary Examiner* — Wei Zhao
(74) *Attorney, Agent, or Firm* — Harrity & Harrity, LLP

(57) ABSTRACT

The subject technology provides for initiating a communication interface in a wireless communication system. In an embodiment, a neighbor node is discovered at an access point. The subject technology receives, via a network message in response to discovering the neighbor node, an address indication associated with the neighbor node for configuration of the communication interface. It is then determined whether to initiate one of a direct communication interface or indirect communication interface for communication with the neighbor node based on the address indication in the received network message.

30 Claims, 10 Drawing Sheets

(51) Int. Cl.
*H04W 84/04* (2009.01)
*H04W 92/20* (2009.01)
*H04W 88/16* (2009.01)

(56) References Cited

U.S. PATENT DOCUMENTS

2014/0302856 A1* 10/2014 Nory .............. H04W 48/10
455/437
2015/0289302 A1* 10/2015 Xu ................. H04W 76/02
370/329

FOREIGN PATENT DOCUMENTS

WO 2014069908 A1 5/2014
WO 2014196371 A2 12/2014

OTHER PUBLICATIONS

International Search Report and Written Opinion—PCT/US2014/063525—ISA/EPO—Feb. 19, 2015.
Nokia Siemens Networks: "HeNB initiated discovery", 3GPP Draft; R3-130075 Discovery@HENB, 3rd Generation Partnership Project (3GPP), Mobile Competence Centre; 650, Route Des Lucioles; F-06921 Sophia-Antipolis Cedex; France, vol. RAN WG3, No. Malta; Jan. 28, 2013-Feb. 1, 2013, Jan. 19, 2013 (Jan. 19, 2013), pp. 1-4, XP050671002, Retrieved from the Internet:URL:http://www.3gpp.org/ftp/tsg_ran/WG3_lu/TSGR3_79/Docs/ [retrieved on Jan. 19, 2013].
QUALCOMM Incorporated: "Comparison of Discovery and X2 Setup options for X2-GW", 3GPP Draft; R3-130672_X2_Setup_Comparison, 3rd Generation Partnership Project (3GPP), Mobile Competence Centre; 650, Route Des Lucioles; F-06921 Sophia-Antipolis Cedex; France vol. RAN WG3, No. Chicago, USA; Apr. 15, 2013-Apr. 19, 2013, Apr. 6, 2013 (Apr. 6, 2013), pp. 1-3, XP050700681,Retrieved from the Internet:URL:http://www.3gpp.org/ftp/tsg_ran/WG3_lu/TSGR3_79bis/Docs/ [retrieved on Apr. 6, 2013].
QUALCOMM Incorporated: "Discovery of peer nodes with X2-GW Deployment", 3GPP Draft, R3-130215 X2GW Discovery, 3rd Generation Partnership Project (3GPP), Mobile Competence Centre, 650, Route Des Lucioles, F-06921 Sophia-Antipolis Cedex, France, vol. RAN WG3, no. Malta, Jan. 28, 2013-Feb. 1, 2013, Jan. 19, 2013 (Jan. 19, 2013), XP050671031, 4 pages. Retrieved from the Internet: URL:http://www.3gpp.org/ftp/tsg_ran/WG3_lu/TSGR3_79/Docs/.

* cited by examiner

METHOD AND APPARATUS FOR DETERMINING TO USE X2 GATEWAY FOR X2 INTERFACE

CROSS-REFERENCE TO RELATED APPLICATION

This application claims priority pursuant to 35 U.S.C. §119(e) to U.S. provisional application Ser. No. 61/899,022, filed Nov. 1, 2013, which is hereby incorporated by reference, in its entirety.

FIELD

The present disclosure relates to communication systems and to techniques for establishing an X2 interface.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, etc.

SUMMARY

Methods, apparatus and systems for initiating a communication interface in a wireless communication system are described in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for initiating a communication interface in a wireless communication system is provided. The method includes discovering a neighbor node at an access point, receiving, via a network message in response to discovering the neighbor node, an address indication associated with the neighbor node for configuration of the communication interface, and determining whether to initiate one of a direct communication interface or indirect communication interface for communication with the neighbor node based on the address indication in the received network message. The direct communication interface may be an X2 interface and the indirect communication interface may be an X2 interface via an X2 gateway (X2-GW) serving as a proxy.

In a further aspect, the method may further include initiating the direct communication interface responsive to the address indication in the received network message indicating that the neighbor node does not support the indirect communication interface. Determining whether to initiate one of a direct communication interface or indirect communication interface may be based on a configuration of the access point and the support of the indirect communication interface based on the address indication comprising an address or a special value associated with the X2-GW of the neighbor node in the received network message.

In addition, determining whether to use the direct communication interface or the indirect communication interface is further based on at least one of support for the direct communication interface, support for the indirect communication interface, an operations, administration, maintenance (OAM) configuration, an identity of the neighbor node including a physical cell identifier (PCI), enhanced cell global identifier (eCGI), or closed subscriber group (CSG) identity, in which the determining may be further based on the address indication from the target. Further, the method may provide for initiating the direct or indirect communication interface based on the aforementioned determination.

In yet further aspects, the method may provide for, after discovering the neighbor node at the access point, initiating transport network layer (TNL) address discovery by sending a TNL address request to the neighbor node, in which the receiving the network message is in response to initiating the TNL address discovery. The network message may be a self-organizing network (SON) configuration transfer message comprising the address indication associated with the neighbor node.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a non-transitory computer-readable medium holding encoded instructions, which when executed by a processor, cause a wireless communications apparatus to perform the methods and aspects of the methods as summarized above.

All of the operations of the foregoing methods may be performed by a network entity or entities of a wireless communication system(s), using components as described in more detail elsewhere herein

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
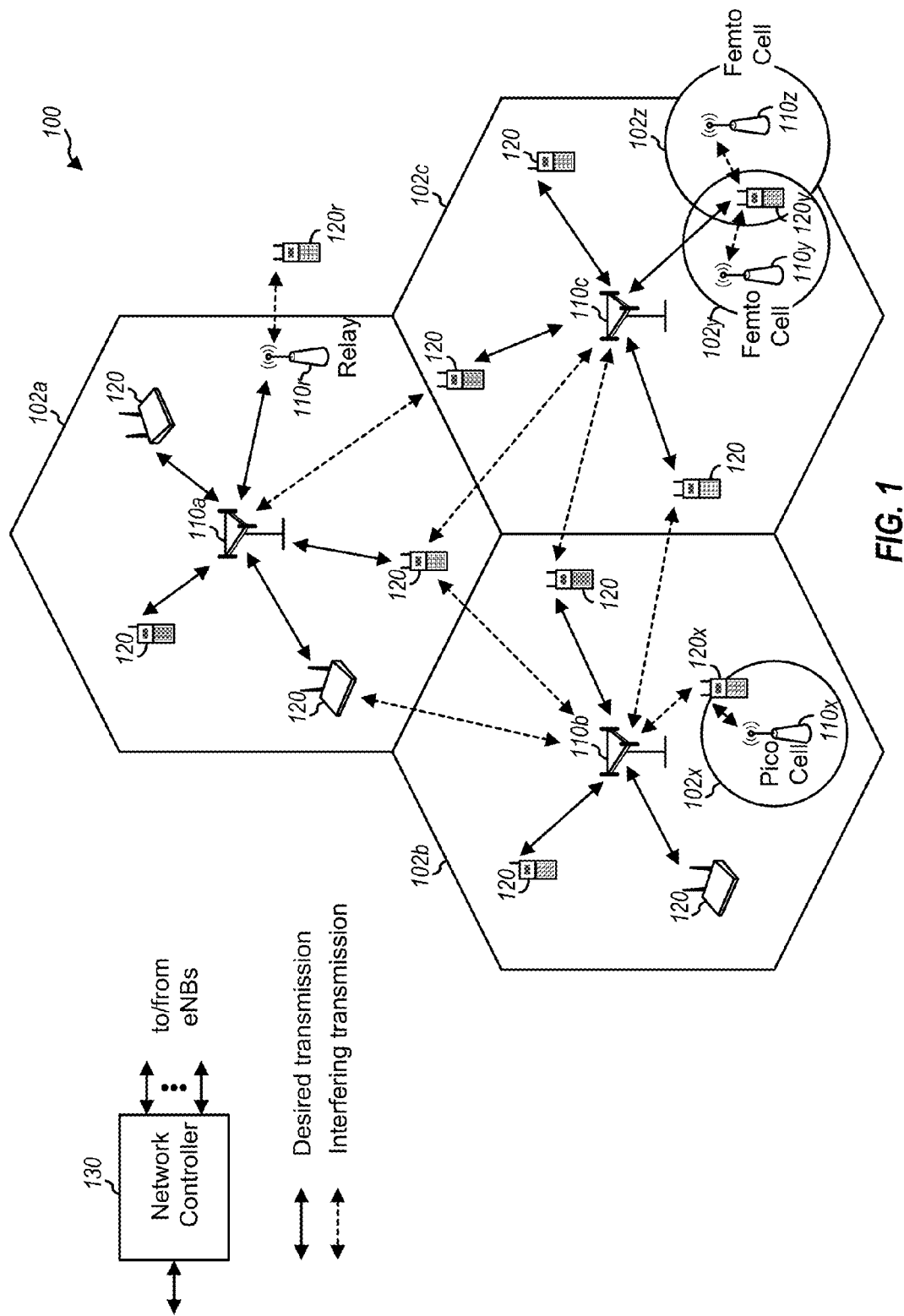
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
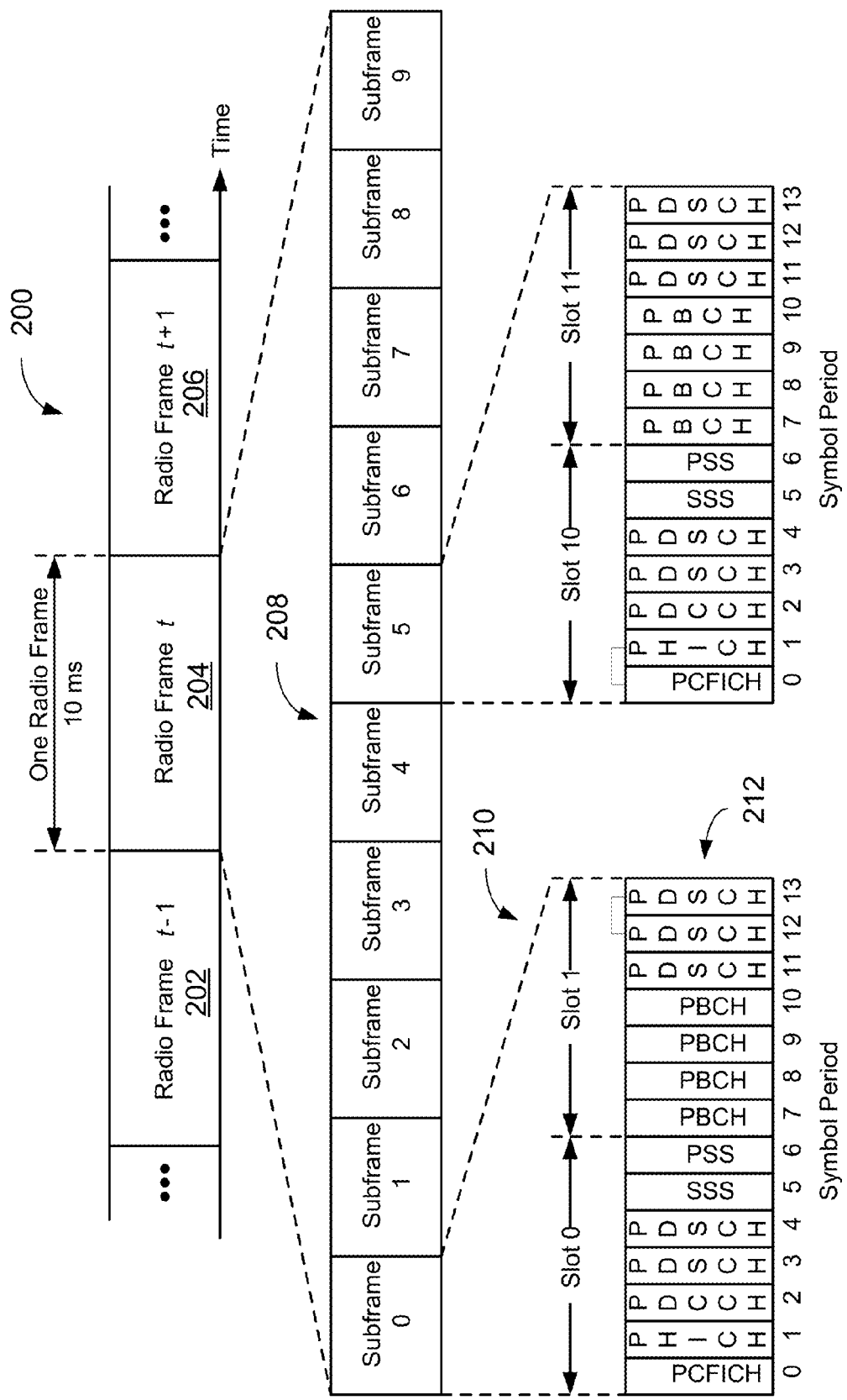
FIG. 2 is a block diagram conceptually illustrating an example of a down link frame structure in a telecommunications system.
Figure 6:
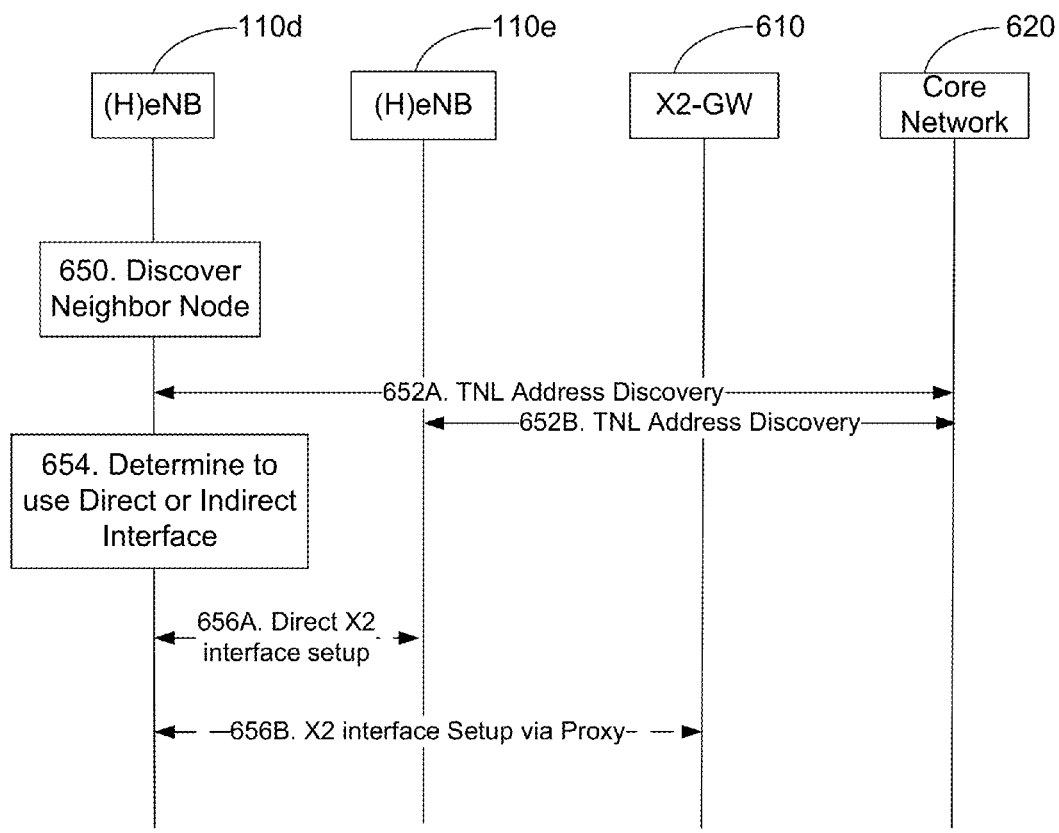
FIG. 6 is a call flow diagram illustrating X2 communication interface initiation between (H)eNBs.

FIG. 2 shows a down link frame structure used in LTE. The transmission timeline for the downlink may be partitioned into units of radio frames. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
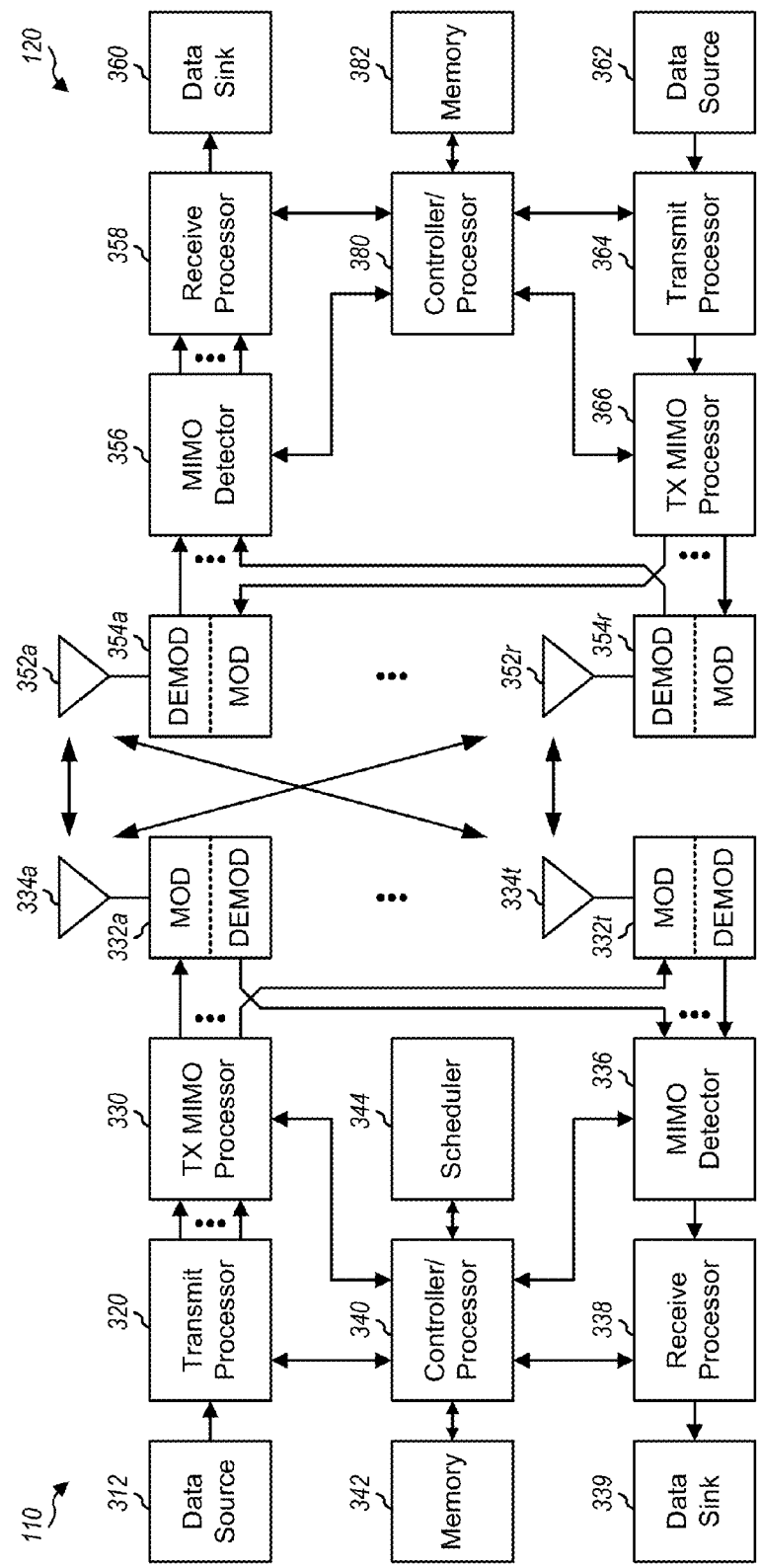
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
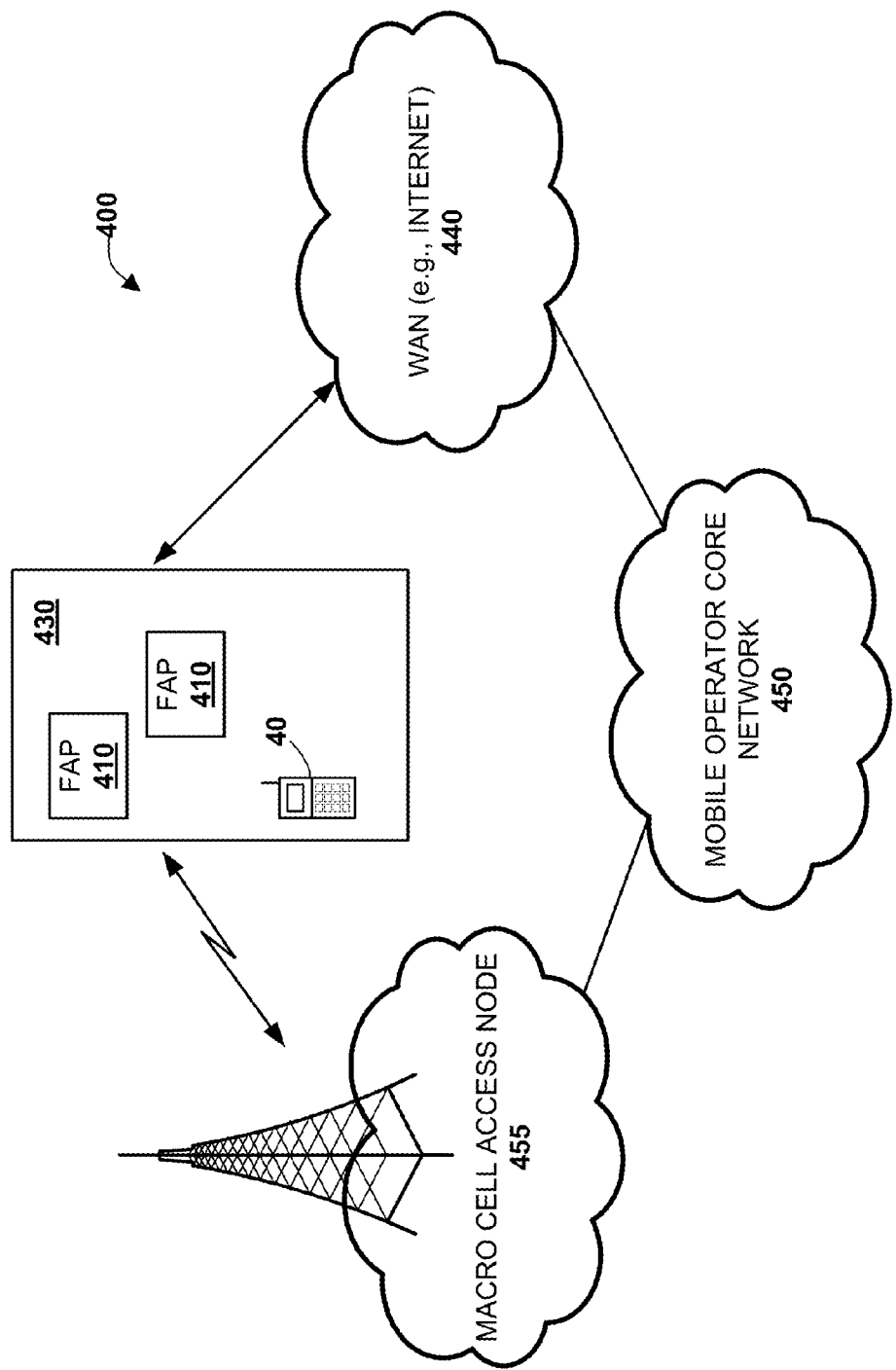
FIG. 4 is a block diagram illustrating another example communication system.

FIG. 4 is an illustration of a planned or semi-planned wireless communication environment 400, in accordance with various aspects. Communication environment 400 includes multiple access point base stations, including FAPs 410, each of which are installed in corresponding small scale network environments. Examples of small scale network environments can include user residences, places of business, indoor/outdoor facilities 430, and so forth. The FAPs 410 can be configured to serve associated UEs 40 (e.g., included in a CSG associated with FAPs 410), or optionally alien or visitor UEs 40 (e.g., UEs that are not configured for the CSG of the FAP 410). Each FAP 410 is further coupled to a wide area network (WAN) (e.g., the Internet 440) and a mobile operator core network 450 via a DSL router, a cable modem, a broadband over power line connection, a satellite Internet connection, or the like.

To implement wireless services via FAPs 410, an owner of the FAPs 410 subscribes to mobile service offered through the mobile operator core network 450. Also, the UE 40 can be capable to operate in a macro cellular environment and/or in a residential small scale network environment, utilizing various techniques described herein. Thus, at least in some disclosed aspects, FAP 410 can be backward compatible with any suitable existing UE 40. Furthermore, in addition to the macro cell mobile network 455, UE 40 is served by a predetermined number of FAPs 410, specifically FAPs 410 that reside within a corresponding user residence(s), place(s) of business, or indoor/outdoor facilities 430, and cannot be in a soft handover state with the macro cell mobile network 455 of the mobile operator core network 450. It should be appreciated that although aspects described herein employ 3GPP terminology, it is to be understood that the aspects can also be applied to various technologies, including 3GPP technology (Release 99 [Rel99], Rel5, Rel6, Rel7), 3GPP2 technology (1×RTT, 1×EV-DO Rel0, RevA, RevB), and other known and related technologies.

In at least one embodiment, eNBs are typically interconnected with other eNBs via an interface called an "X2" interface, which may be a logical interface (e.g., a point to point link) that enables at least two respective eNBs to be directly connected to each other (e.g., in a peer-to-peer manner) that facilitates communication with one another. In this regard, the X2 interface may be established between one eNB and some of its neighbor eNBs in order to exchange signaling information, among other types of information or data. An initialization of the X2 interface can commence, at a first eNB, with an identification of a suitable neighbor eNB followed by setting up the transport network layer (TNL) in an example. In some implementations, the identification of a neighbor may be done by configuration or by an automatic neighbor relation function. In a similar manner, a given HeNB may also establish a connection between other HeNBs via an X2 interface to enable direct communication between one another. Thus, the X2 interface therefore may connect neighboring eNBs to one another or neighboring HeNBs to each other in a peer-to-peer manner to assist, for example, in handover, coordination of radio resources, load management, among other functions, etc. In an example, eNBs may be connected to an X2-Gateway, and HeNBs may also be connected to the same X2-Gateway. In some situations, it may be advantageous to have the X2 interface(s) be able to connect eNBs with HeNBs and/or vice-versa in accordance with embodiments described herein.

Figure 5:
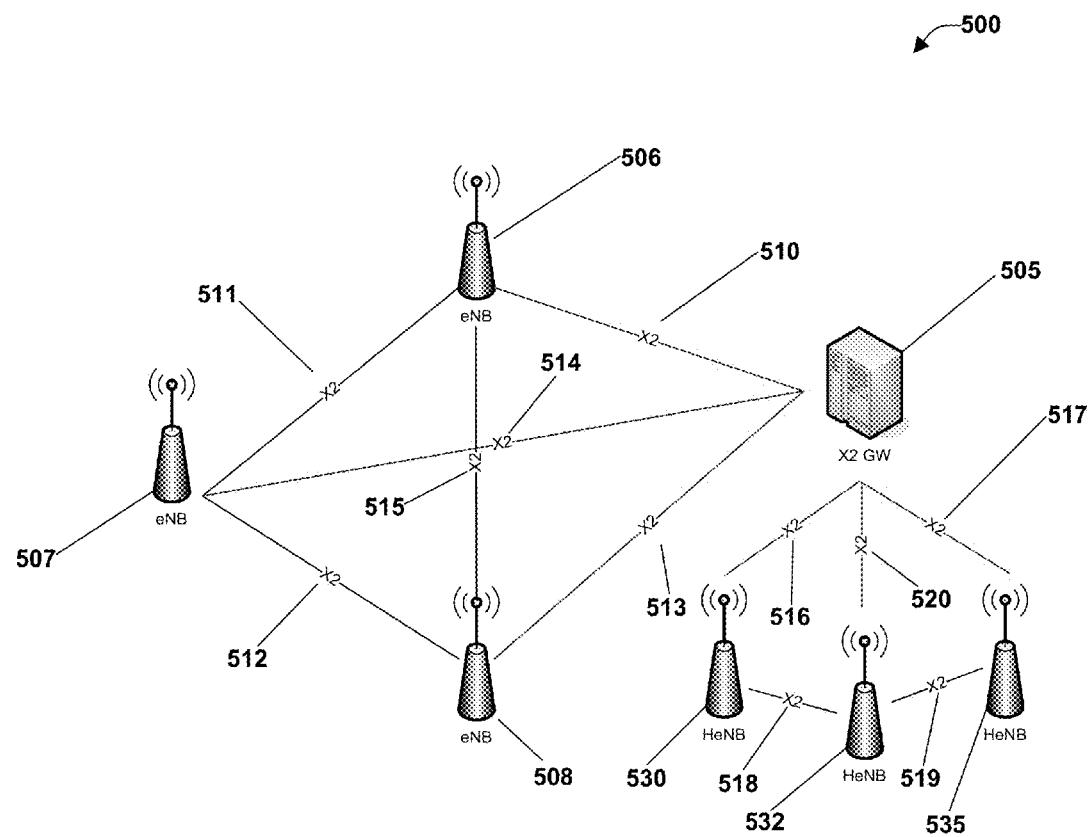
FIG. 5 is a block diagram of yet another example communication system.

FIG. 5 is a block diagram of yet another example communication system 500, describing an X2-Gateway (X2-GW) reference architecture. An X2 interface may be used for direct communication between eNBs and HeNBs. FIG. 5 shows an X2-GW 505 coupled to eNBs 506, 507 and 508 and HeNBs 530, 535 and 535 via respective X2 interfaces. As illustrated in FIG. 5, the aforementioned eNBs/HeNBs may be connected to other eNBs/HeNBs via "direct" X2 interfaces 511, 512, 515, 518, and 519, or via "indirect" X2 interfaces 510, 513, 514, 516, 517, and 520 by way of the X2-GW 505 acting as a proxy server. With the addition of the X2-GW 505, the X2 interface may be modified to enable the X2-GW 505 functions as further described by the following. The X2-GW 505 can act as a full proxy where a HeNB and eNB connect to the X2-GW 505 using existing X2 setup and reset procedures. The HeNBs and eNBs route X2 messages to the X2-GW 505, (e.g., based on eNB ID, TAI, e-CGI, CSG ID, etc.) such that there may be no need to exchange eNB configuration between the eNBs, and the cells behind the X2-GW 505 may be hidden from the source eNB. The X2-GW 505 can also act as a routing proxy where eNB-to-HeNB or HeNB-to-HeNB X2 messages may be routed at the X2-GW 505 based on the (H)eNB ID or cell ID (e.g., the target and source (H)eNB IDs may need to be added to the X2 message if needed to enable simple routing by the X2-GW 505). It is noted that the X2-GW 505 here refers to X2 full proxy or X2 routing proxy as defined. It may be noted that an error message may need to be defined for the case where the X2-GW 505 does not support the eNB ID/cell ID for a received message.

The X2-GW 505 may exist in 3GPP to help enable X2 connection between HeNBs and eNBs. The X2-GW 505 may act as a proxy between peer nodes such that it may facilitate X2 setup and route other X2 application protocol (X2AP) connections.

One issue may relate to how to determine whether to setup a direct or indirect X2 interface for communication between neighboring (H)eNBs. When a (H)eNB discovers another neighbor (H)eNB (e.g., for the first time), the (H)eNB may learn the transport network layer (TNL) (e.g., IP) address of this neighbor (H)eNB through a self-organizing network (SON) configuration transfer procedure through the MME. In an embodiment, the (H)eNB may initiate a TNL address discovery procedure via a configuration transfer procedure in which the (H)eNB sends a configuration transfer message to the MME that then forwards this message to the neighbor (H)eNB. The configuration transfer message, among other types of data, may include a request for a TNL or IP address, a global cell identifier for the neighbor (H)eNB and/or a transport address for the (H)eNB, and after receiving the configuration transfer message, the neighbor (H)eNB sends back its TNL or IP address. For the X2-GW 505, it may be reasonable to expand this procedure to also report the X2-GW 505 TNL address. The term source node or simply "source" may be used for the node that initiates the SON configuration transfer procedure and the term target node or simply "target" may be used for the node that responds to the SON configuration transfer procedure.

In a current design, the HeNB may be connected to a single X2-GW 505 and may be configured with the TNL address of this X2-GW 505. However, there may be no such configuration for a macro eNB, which may connect to one or multiple X2-GW 505s.

To solve the problem of determining whether to use the X2-GW 505 (e.g., in an indirect X2 interface) or not, it is proposed that the target (H)eNB may include the X2-GW 505 TNL address as part of the SON configuration transfer procedure if the target may use or support the X2 connection through the X2-GW 505 with the source (H)eNB.

The target node may not include this address if the target node may not use the X2-GW 505 or prefers to use a direct X2 interface, for example based on operations, administration, maintenance (OAM) configuration and/or the source identity (e.g., physical cell identifier (PCI), enhanced cell global identifier (eCGI), closed subscriber group (CSG) ID/membership, etc.).

If the target node is a macro eNB, then the target may not be able to signal a specific X2-GW address since there may be multiple X2-GWs that the target may connect to. If the target eNB can determine the X2-GW TNL address of the source HeNB based on configuration, it may include this in the SON configuration transfer to indicate that it may connect to the source via this X2-GW. However, if the X2-GW TNL address for the source HeNB is not available to the target, the target may still need to signal to the source HeNB that this eNB is able to use a connection via the X2-GW. To solve this issue, a special value may be included in the X2-GW TNL address field in the SON configuration transfer procedure. This special value may be chosen not to correspond to an actual TNL address, or the eNB may include its own TNL address. This may allow the source HeNB to determine that this target eNB is able to use the X2-GW connection.

The current SON transfer configuration message may include the target TNL address as a mandatory field. If the target (H)eNB prefers to use only the indirect connection, it may also put a special value in the target TNL address while including the X2-GW TNL address (or the specific value in case of a macro eNB) where the special value indicates that the direct connection is not available.

It may be noted that the target (H)eNB may include the TNL address of an X2-GW in the SON configuration transfer message to indicate the availability of X2 connection via the X2-GW when the target (H)eNB is connected to the X2-GW or when the target (H)eNB knows that the source (H)eNB is connected to the X2-GW. In another example, the target (H)eNB may include a special value for the X2-GW TNL address field in the SON configuration transfer message to indicate the availability of using the X2-GW where a special value may be a specific numeric value which does not correspond to an TNL address or where the special value may be the actual TNL address of the target (H)eNB. In another example, the target (H)eNB may include a special value in the target (H)eNB TNL address to indicate that the direct X2 connection is not available for this source eNB. The determining of whether to use the X2-GW (for the indirect interface) or not (for the direct interface) for an X2 connection may be configured by the OAM based on the identity information of the source (H)eNB, with the identity information including such information as PCI, or eCGI, CSG ID/membership, etc.

It may be noted that the source (H)eNB may determine whether to use the X2 Connection via the X2-GW or not by combining the identity information of the target (H)eNB including PCI, eCGI, CSG ID/membership and the indication received from the target in the SON configuration transfer message for the availability of the X2-GW based connection at the target. The source (H)eNB may make the selection even if the target node indicates a preference for one X2 interface when the target supports both direct and indirect X2 connections. For example, even if the target node sent an X2-GW TNL address indicating a preference for an indirect X2 interface, the source node may determine to use a direct interface overriding or ignoring the preference of the target node. In this case, the source node may decide to use the direct X2 interface or indirect X2 interface even if (or alternatively, without considering whether) the target node supports the indirect X2 interface. The source (H)eNB may send the X2 Setup Request to the target (H)eNB or to the X2-GW based on this determination.

FIG. 6 is a call flow diagram illustrating X2 communication interface initiation between (H)eNBs. The example communication system in FIG. 6 may include one or more (H)eNBs 110d-e, an X2-GW 610, and a core network 620. The X2 interface initiation process may include one of a direct X2 interface between (H)eNBs or an indirect X2 interface between the (H)eNBs.

In the example of FIG. 6, the process may begin at step 650, with an (H)eNB 110d discovering a neighbor node such as (H)eNB 110e. After discovering the neighbor node (H)eNB 110e, (H)eNB 110d may determine an address of the neighbor node. For example, (H)eNB 110d may initiate an TNL address discovery process to determine the TNL address of (H)eNB 110e. In an embodiment, as part of initiating the TNL address discovery process, the (H)eNB 110d may send a TNL address request in a message to the (H)eNB 110e. In this case, the node (H)eNB 110d sending the TNL address request may be referred to as the source node and the destination node (H)eNB 110e may be referred to as the target node. At steps 652A-B, (H)eNB 110d may determine the TNL address of (H)eNB 110e. In an embodiment, the TNL address discovery process may be carried out via a message to the target node (H)eNB 110d sent out via the core network 620. For example, the message may be a SON configuration transfer message. The target node (H)eNB 110e may determine whether it desires to use a direct X2 connection or an indirect X2 connection or interface via the X2-GW serving as a proxy. The determination of whether to use the direct or indirect interface may be based on OAM configuration, the source node identity and target node identity, or whether the target node (H)eNB 110e supports the direct and/or indirect interface.

In case (H)eNB 110e determines to use the indirect interface via the X2-GW, (H)eNB 110e may send the TNL address of the X2-GW in the SON configuration transfer message. If the target node (H)eNB 110e is a macro node, (H)eNB 110e may be connected to more than one X2-GW. For this case, in one example, the (H)eNB 110e may include a special value (e.g., a predetermined value that may be known to the source node) to indicate the target node is a macro node which supports an interface via the X2-GW connections. For this case, in another example, the (H)eNB 110e may include its own TNL address in the field for the X2-GW TNL address.

In case (H)eNB 110e determines to use the direct interface, (H)eNB 110d may not send the X2-GW TNL address by not including any information in this field or it may send a special value (e.g., a predetermined value that may be known to the source node) to indicate that (H)eNB 110e does not support the indirect interface or desires to use the direct interface.

At step 654, the (H)eNB 110d may determine whether to use the direct or indirect interface. For example, the determination may be based on the TNL address received in the SON configuration transfer message. In case (H)eNB 110d determines to use the direct interface, (H)eNB 110d may initiate the X2 interface with (H)eNB 110e, at step 656A. In case (H)eNB 110e determines to use the indirect interface, (H)eNB 110d may initiate the X2 interface with (H)eNB 110e via the X2-GW 610, at step 656B.

Figure 7:
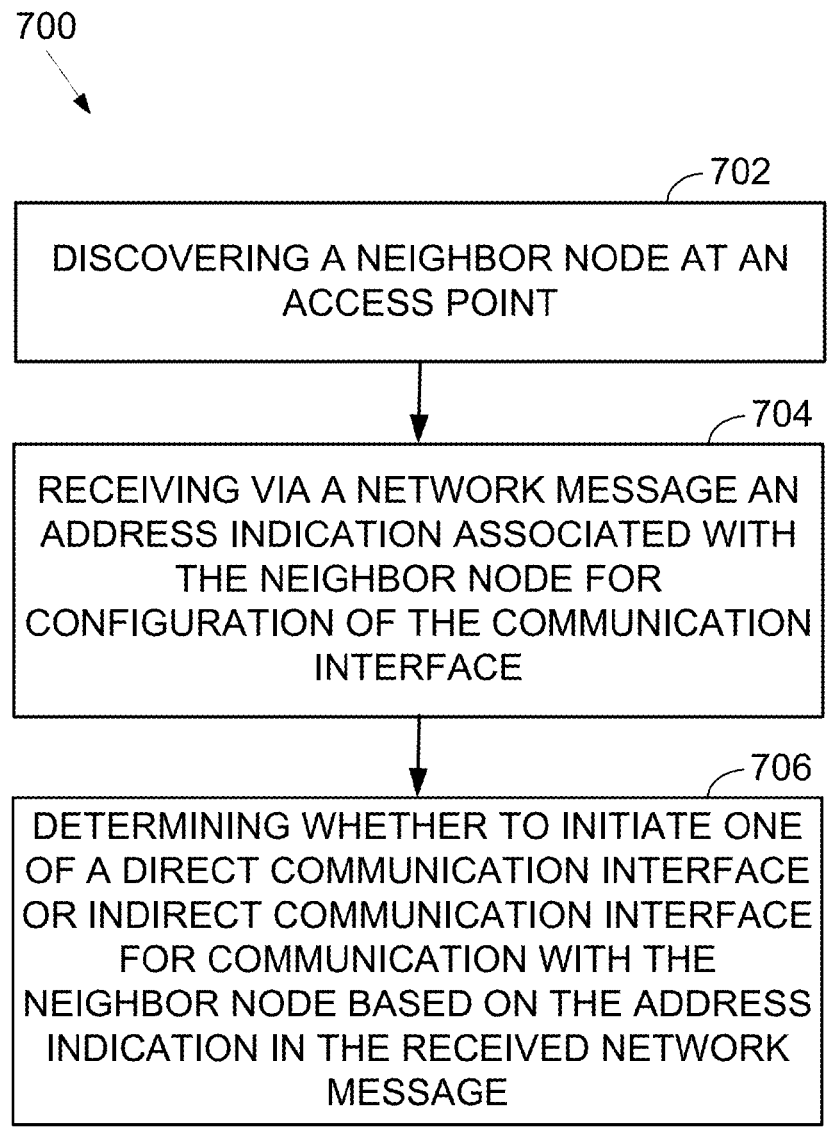
FIG. 7 illustrates an exemplary methodology for X2 interface initiation for a source node.

In accordance with one or more aspects of the embodiments described herein, with reference to FIG. 7, there is shown a methodology 700, operable by a network entity, such as, for example, a femtocell, a macrocell, a picocell, or the like. Specifically, method 700 describes a procedure for initiating an X2 interface at a source node. The method 700 may involve, at 702, discovering a neighbor node at an access point. The method 700 may involve, at 704, receiving, via a network message, an address indication associated with the neighbor node for configuration of the communication interface. The method 700 may involve, at 706, determining whether to initiate one of a direct communication interface or indirect communication interface for communication with the neighbor node based on the address indication in the received network message.

Figure 8:
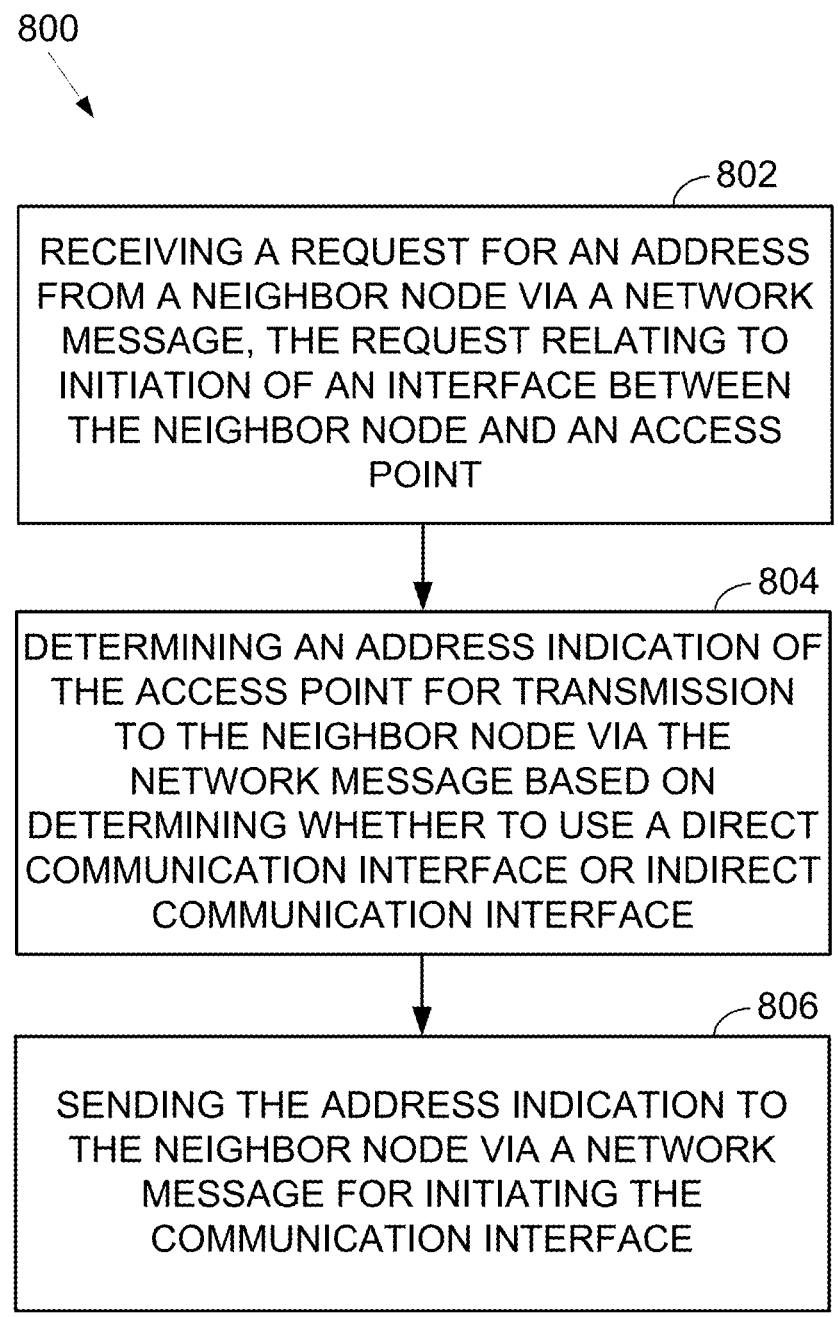
FIG. 8 illustrates an exemplary methodology for X2 interface initiation for a target node.

With reference to FIG. 8, there is shown a methodology 800, operable by a network entity, such as, for example, a femtocell, a macrocell, a picocell, or the like. Specifically, method 800 describes a procedure for initiating an X2 interface at a source node. The method 800 may involve, at 802, receiving a request for an address from a neighbor node via a network message, the request relating to initiation of an interface between the neighbor node and an access point. The method 800 may involve, at 804, determining an address indication of the access point for transmission to the neighbor node via the network message based on determining whether to use a direct communication interface or indirect communication interface. The method 800 may involve, at 806, sending the address indication to the neighbor node via a network message for initiating the communication interface.

Figure 9:
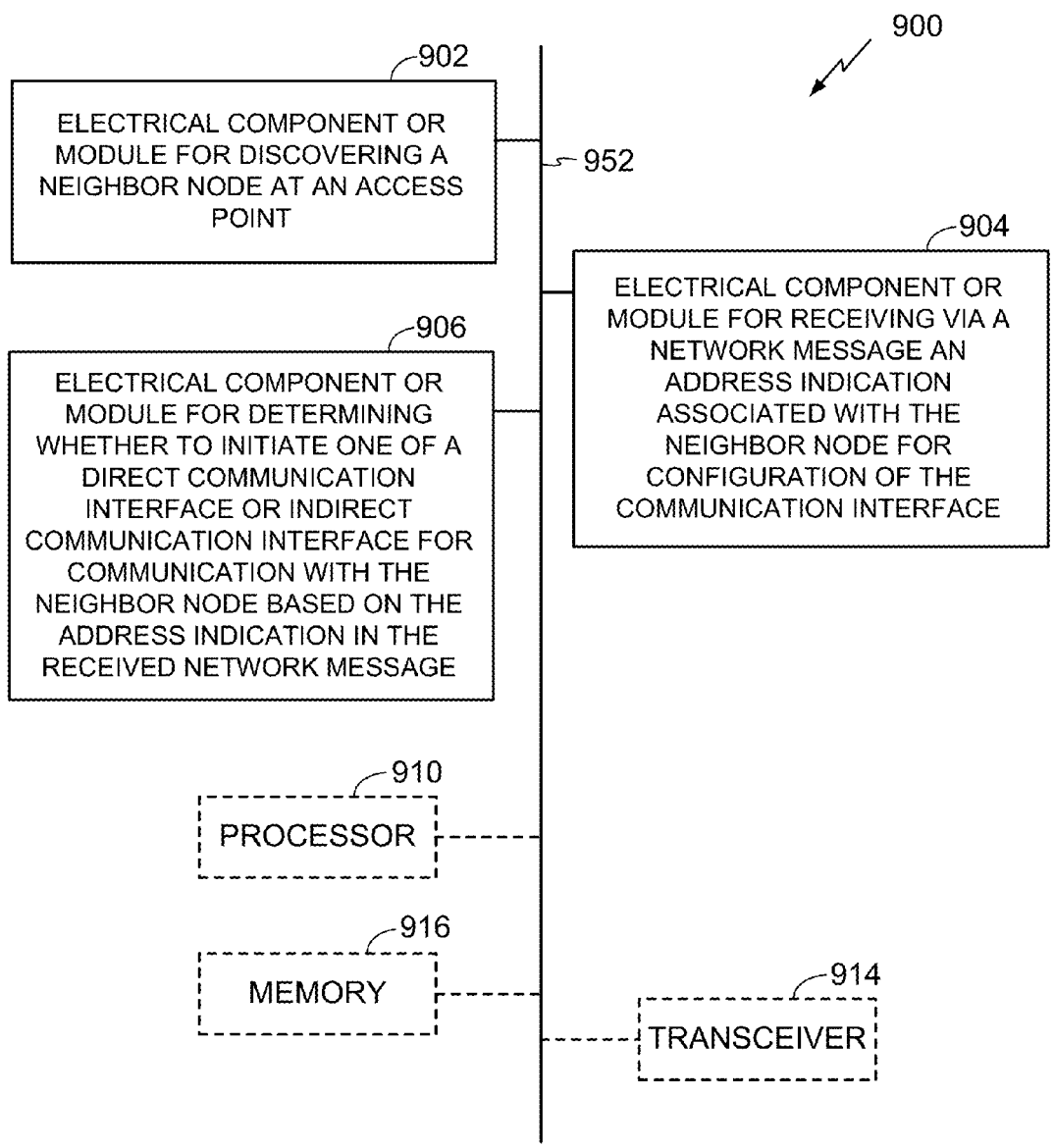
FIG. 9 shows an embodiment of an apparatus for X2 interface initiation, in accordance with the methodology of FIG. 7.

FIG. 9 shows an embodiment of an apparatus for initiating an X2 interface, in accordance with the methodology of FIG. 7. With reference to FIG. 9, there is provided an exemplary apparatus 900 that may be configured as a network entity (e.g., a femtocell, a macrocell, a picocell, or the like) in a wireless network, or as a processor or similar device/component for use within the network entity. The apparatus 900 may include functional blocks that can represent functions implemented by a processor, software, or combination thereof (e.g., firmware). For example, apparatus 900 may include an electrical component or module 902 for discovering a neighbor node at an access point. The apparatus 900 may include an electrical component or module 904 for receiving via a network message an address indication associated with the neighbor node for configuration of the communication interface. The apparatus 900 may include an electrical component or module 906 for determining whether to initiate one of a direct communication interface or indirect communication interface for communication with the neighbor node based on the address indication in the received network message.

In related aspects, the apparatus 900 may optionally include a processor component 910 having at least one processor, in the case of the apparatus 900 configured as a network entity (e.g., a femtocell, a macrocell, a picocell, or the like), rather than as a processor. The processor 910, in such case, may be in operative communication with the components 902-906 via a bus 952 or similar communication coupling. The processor 910 may effect initiation and scheduling of the processes or functions performed by electrical components 902-906.

In further related aspects, the apparatus 900 may include a radio transceiver component 914. A stand alone receiver and/or stand alone transmitter may be used in lieu of or in conjunction with the transceiver 914. When the apparatus 900 is a network entity, the apparatus 900 may also include a network interface (not shown) for connecting to one or more core network entities. The apparatus 900 may optionally include a component for storing information, such as, for example, a memory device/component 916. The computer readable medium or the memory component 956 may be operatively coupled to the other components of the apparatus 900 via the bus 952 or the like. The memory component 916 may be adapted to store computer readable instructions and data for effecting the processes and behavior of the components 902-906, and subcomponents thereof, or the processor 910, or the methods disclosed herein. The memory component 916 may retain instructions for executing functions associated with the components 902-906. While shown as being external to the memory 916, it is to be understood that the components 902-906 can exist within the memory 916. It is further noted that the components in FIG. 9 may comprise processors, electronic devices, hardware devices, electronic sub-components, logical circuits, memories, software codes, firmware codes, etc., or any combination thereof.

Figure 10:
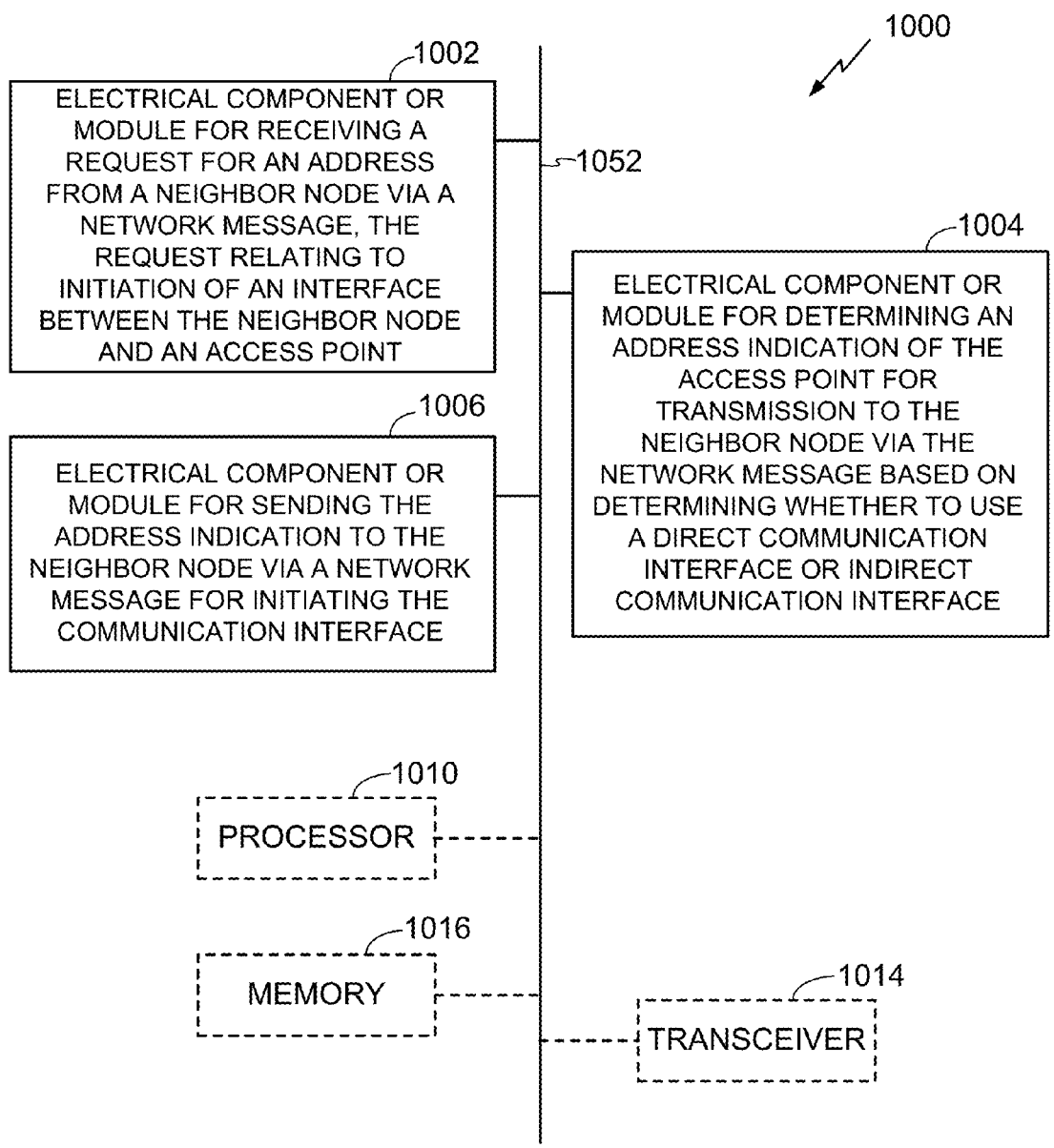
FIG. 10 shows an embodiment of an apparatus for X2 interface initiation, in accordance with the methodology of FIG. 8.

FIG. 10 shows an embodiment of an apparatus for initiating an X2 interface, in accordance with the methodology of FIG. 8. With reference to FIG. 10, there is provided an exemplary apparatus 1000 that may be configured as a network entity (e.g., a femtocell, a macrocell, a picocell, or the like) in a wireless network, or as a processor or similar device/component for use within the network entity. The apparatus 1000 may include functional blocks that can represent functions implemented by a processor, software, or combination thereof (e.g., firmware). For example, apparatus 1000 may include an electrical component or module 1002 for receiving a request for an address from a neighbor node via a network message, the request relating to initiation of an interface between the neighbor node and an access point. The apparatus 1000 may include an electrical component or module 1004 for determining an address indication of the access point for transmission to the neighbor node via the network message based on determining whether to use a direct communication interface or indirect communication interface. The apparatus 1000 may include an electrical component or module 1006 for sending the address indication to the neighbor node via a network message for initiating the communication interface.

In related aspects, the apparatus 1000 may optionally include a processor component 1010 having at least one processor, in the case of the apparatus 1000 configured as a network entity (e.g., a femtocell, a macrocell, a picocell, or the like), rather than as a processor. The processor 1010, in such case, may be in operative communication with the components 1002-1006 via a bus 1052 or similar communication coupling. The processor 1010 may effect initiation and scheduling of the processes or functions performed by electrical components 1002-1006.

In further related aspects, the apparatus 1000 may include a radio transceiver component 1014. A stand-alone receiver and/or stand-alone transmitter may be used in lieu of or in conjunction with the transceiver 1014. When the apparatus 1000 is a network entity, the apparatus 1000 may also include a network interface (not shown) for connecting to one or more core network entities. The apparatus 1000 may optionally include a component for storing information, such as, for example, a memory device/component 1016. The computer readable medium or the memory component 1056 may be operatively coupled to the other components of the apparatus 1000 via the bus 1052 or the like. The memory component 1016 may be adapted to store computer readable instructions and data for effecting the processes and behavior of the components 1002-1006, and subcomponents thereof, or the processor 1010, or the methods disclosed herein. The memory component 1016 may retain instructions for executing functions associated with the components 1002-1006. While shown as being external to the memory 1016, it is to be understood that the components 1002-1006 can exist within the memory 1016. It is further noted that the components in FIG. 10 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for initiating a communication interface in a wireless communication system, the method comprising:
   discovering a neighbor node at an access point;
   receiving, based on discovering the neighbor node, a network message that includes an address indication, associated with the neighbor node, for configuration of the communication interface; and
   determining whether to initiate one of a direct communication interface or an indirect communication interface for communication with the neighbor node based on the address indication and based on at least one of: support for the direct communication interface, support for the indirect communication interface, an operation, administration, maintenance (OAM) configuration, an identity of the neighbor node including a physical cell identifier (PCI), or a closed subscriber group (CSG) identity.

2. The method of claim 1, wherein the direct communication interface comprises an X2 interface and the indirect communication interface comprises an X2 interface via an X2 gateway (X2-GW) serving as a proxy.

3. The method of claim 1, wherein determining whether to initiate one of the direct communication interface or the indirect communication interface comprises:
   determining to initiate the direct communication interface when the address indication indicates that the neighbor node does not support the indirect communication interface.

4. The method of claim 1, wherein determining whether to initiate one of the direct communication interface or the indirect communication interface is based on a configuration of the access point.

5. The method of claim 1, wherein determining whether to initiate one of the direct communication interface or the indirect communication interface is based on an enhanced cell global identifier (eCGI).

6. The method of claim 1, further comprising:
   initiating the direct communication interface or the indirect communication interface based on determining whether to initiate one of the direct communication interface or the indirect communication interface.

7. The method of claim 1, further comprising:
   after discovering the neighbor node at the access point, initiating transport network layer (TNL) address discovery by sending a TNL address request to the neighbor node, wherein receiving the network message is based on initiating the TNL address discovery.

8. The method of claim 1, wherein the network message comprises a self-organizing network (SON) configuration transfer message comprising the address indication.

9. An apparatus for initiating a communication interface in a wireless communication system, the apparatus comprising:
   means for discovering a neighbor node at the apparatus;
   means for receiving, based on discovering the neighbor node, a network message that includes an address indication, associated with the neighbor node, for configuration of the communication interface; and
   means for determining whether to initiate one of a direct communication interface or an indirect communication interface for communication with the neighbor node based on the address indication and based on at least one of: support for the direct communication interface, support for the indirect communication interface, an operation, administration, maintenance (OAM) configuration, an identity of the neighbor node including a physical cell identifier (PCI), or a closed subscriber group (CSG) identity.

10. The apparatus of claim 9, wherein the direct communication interface comprises an X2 interface and the indirect communication interface comprises an X2 interface via an X2 gateway (X2-GW) serving as a proxy.

11. The apparatus of claim 9, wherein the means for determining whether to initiate one of the direct communication interface or the indirect communication interface comprise:

means for determining to initiate the direct communication interface when the address indication indicates that the neighbor node does not support the indirect communication interface.

12. The apparatus of claim 9, wherein the means for determining whether to initiate one of the direct communication interface or the indirect communication interface comprise:
means for determining whether to initiate one of the direct communication interface or the indirect communication interface is based on the address indication and an address or a value associated with an X2 gateway (X2-GW) of the neighbor node.

13. The apparatus of claim 9, wherein the means for determining whether to initiate one of the direct communication interface or the indirect communication interface comprise:
means for determining whether to initiate one of the direct communication interface or the indirect communication interface is based on an enhanced cell global identifier (eCGI).

14. The apparatus of claim 9, further comprising:
means for initiating the direct communication interface or the indirect communication interface based on determining whether to initiate one of the direct communication interface or the indirect communication interface.

15. The apparatus of claim 9, further comprising:
means for initiating, after discovering the neighbor node at the apparatus, transport network layer (TNL) address discovery by sending a TNL address request to the neighbor node, wherein the network message is received based on initiating the TNL address discovery.

16. The apparatus of claim 9, wherein the network message comprises a self-organizing network (SON) configuration transfer message comprising the address indication.

17. An apparatus for initiating a communication interface in a wireless communication system, the apparatus comprising:
at least one processor configured to discover a neighbor node at the apparatus;
at least one transceiver configured to receive, based on discovering the neighbor node, a network message that includes an address indication, associated with the neighbor node, for configuration of the communication interface,
wherein the at least one processor is further configured to:
determine whether to initiate one of a direct communication interface or an indirect communication interface for communication with the neighbor node based on the address indication and based on at least one of: support for the direct communication interface, support for the indirect communication interface, an operation, administration, maintenance (OAM) configuration, an identity of the neighbor node including a physical cell identifier (PCI), or a closed subscriber group (CSG) identity; and
a memory coupled to the at least one processor.

18. The apparatus of claim 17, wherein the direct communication interface comprises an X2 interface and the indirect communication interface comprises an X2 interface via an X2 gateway (X2-GW) serving as a proxy.

19. The apparatus of claim 17, wherein the at least one processor, when determining whether to initiate one of the direct communication interface or the indirect communication interface, is configured to:
determine to initiate the direct communication interface when the address indication indicates that the neighbor node does not support the indirect communication interface.

20. The apparatus of claim 17, wherein the at least one processor, when determining whether to initiate one of the direct communication interface or the indirect communication interface is configured to:
determine whether to initiate one of the direct communication interface or the indirect communication interface based on the address indication and an address or a value associated with an X2 gateway (X2-GW) of the neighbor node.

21. The apparatus of claim 17, wherein the at least one processor, when determining whether to initiate one of the direct communication interface or the indirect communication interface, is configured to:
determine whether to initiate one of the direct communication interface or the indirect communication interface based on an enhanced cell global identifier (eCGI).

22. The apparatus of claim 17, wherein the at least one processor is further configured to:
initiate the direct communication interface or the indirect communication interface based on determining whether to initiate one of the direct communication interface or the indirect communication interface.

23. The apparatus of claim 17,
wherein the at least one processor is further configured to:
after discovering the neighbor node at the apparatus, initiate transport network layer (TNL) address discovery by sending a TNL address request to the neighbor node, and
wherein the network message is received based on initiating the TNL address discovery.

24. The apparatus of claim 17, wherein the network message comprises a self-organizing network (SON) configuration transfer message comprising the address indication.

25. A non-transitory computer-readable medium storing instructions, the instructions comprising:
one or more instructions that, when executed by at least one computer, cause the at least one computer to:
discover a neighbor node at an access point;
receive, based on discovering the neighbor node, a network message that includes an address indication, associated with the neighbor node, for configuration of a communication interface; and
determine whether to initiate one of a direct communication interface or an indirect communication interface for communication with the neighbor node based on the address indication and based on at least one of: support for the direct communication interface, support for the indirect communication interface, an operation, administration, maintenance (OAM) configuration, an identity of the neighbor node including a physical cell identifier (PCI), or a closed subscriber group (CSG) identity.

26. The non-transitory computer-readable medium of claim 25, wherein the direct communication interface comprises an X2 interface and the indirect communication interface comprises an X2 interface via an X2 gateway (X2-GW) serving as a proxy.

27. The non-transitory computer-readable medium of claim 25, wherein the one or more instructions to determine whether to initiate one of the direct communication interface or the indirect communication interface comprise:

one or more instructions that, when executed by the at least one computer, cause the at least one computer to:
determine to initiate the direct communication interface when the address indication indicates that the neighbor node does not support the indirect communication interface.

28. The non-transitory computer-readable medium of claim 25, wherein the one or more instructions to determine whether to initiate one of the direct communication interface or the indirect communication interface comprise:

one or more instructions that, when executed by the at least one computer, cause the at least one computer to:
determine whether to initiate one of the direct communication interface or the indirect communication interface based on a configuration of the access point.

29. The non-transitory computer-readable medium of claim 25, wherein the one or more instructions to determine whether to initiate one of the direct communication interface or the indirect communication interface comprise:

one or more instructions that, when executed by the at least one computer, cause the at least one computer to:
determine whether to initiate one of the direct communication interface or the indirect communication interface based on an enhanced cell global identifier (eCGI).

30. The non-transitory computer-readable medium of claim 25, wherein the instructions further comprise:
one or more instructions that, when executed by the at least one computer, cause the at least one computer to:
after discovering the neighbor node at the access point, initiate transport network layer (TNL) address discovery by sending a TNL address request to the neighbor node, wherein the network message is received based on to initiating the TNL address discovery, and wherein the network message comprises a self-organizing network (SON) configuration transfer message comprising the address indication.

* * * * *